US012665436B2

(12) United States Patent　　(10) Patent No.:　US 12,665,436 B2
Kim et al.　　(45) Date of Patent:　Jun. 23, 2026

(54) DEVICE FOR CHARGING AND DISCHARGING BATTERY CELL AND METHOD FOR CHARGING AND DISCHARGING BATTERY CELL USING THE SAME

(71) Applicant: LG ENERGY SOLUTION, LTD., Seoul (KR)

(72) Inventors: Kwang Jin Kim, Daejeon (KR); Seung Cheol Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1015 days.

(21) Appl. No.: 17/792,677

(22) PCT Filed: Oct. 27, 2021

(86) PCT No.: PCT/KR2021/015175
§ 371 (c)(1),
(2) Date: Jul. 13, 2022

(87) PCT Pub. No.: WO2022/108160
PCT Pub. Date: May 27, 2022

(65) Prior Publication Data
US 2023/0043901 A1　　Feb. 9, 2023

(30) Foreign Application Priority Data
Nov. 23, 2020　　(KR) ........................ 10-2020-0157356

(51) Int. Cl.
　*H02J 7/00*　　(2026.01)
　*F15B 15/00*　　(2006.01)
　(Continued)

(52) U.S. Cl.
CPC ................ *H02J 7/70* (2026.01); *F15B 15/00* (2013.01); *H01M 10/46* (2013.01); *H01M 10/486* (2013.01); *H02J 7/80* (2026.01)

(58) Field of Classification Search
CPC .... H01M 10/44; H01M 10/486; H01M 10/46; H02J 7/0042
(Continued)

(56) References Cited

U.S. PATENT DOCUMENTS 10,680,275 B2　6/2020　Bae et al.
2009/0146663 A1 *　6/2009　Takeno ............... H01M 10/486
324/426
(Continued)

FOREIGN PATENT DOCUMENTS

CN　　104813533 A　　7/2015
EP　　2 860 815 A1　　4/2015
(Continued)

OTHER PUBLICATIONS

International Search Report for PCT/KR2021/015175 (PCT/ISA/210) mailed on Feb. 7, 2022.
(Continued)

*Primary Examiner* — Nathaniel R Pelton
(74) *Attorney, Agent, or Firm* — Birch, Stewart, Kolasch & Birch, LLP

(57) ABSTRACT

A device for charging and discharging a battery cell, and a method of charging and discharging a battery cell are provided. The device includes a pair of jigs configured to fix respective electrode leads of the battery cell. Each jig includes a first jig block configured to press a first surface of a corresponding electrode lead of the battery cell, a second jig block configured to press a second surface of the corresponding electrode lead facing the first surface of the corresponding electrode lead, a first jig block control unit
(Continued)

connected to the first jig block to move the first jig block toward the first surface of the corresponding electrode lead, and an interval adjusting member arranged between the first and second jig blocks to control an interval between the first and second jig blocks.

11 Claims, 6 Drawing Sheets

(51) Int. Cl.
*H01M 10/46* (2006.01)
*H01M 10/48* (2006.01)
*H02J 7/70* (2026.01)
*H02J 7/80* (2026.01)

(58) Field of Classification Search
USPC .................................................. 320/107, 128
See application file for complete search history.

(56) References Cited

U.S. PATENT DOCUMENTS

2012/0071040 A1    3/2012  Park et al.
2020/0153030 A1*   5/2020  Bae ....................... H01M 10/44

FOREIGN PATENT DOCUMENTS

| EP | 2860815 | * | 4/2015 |
|----|---------|---|--------|
| JP | 2009-156866 | A | 7/2009 |
| JP | 2020-119823 | A | 8/2020 |
| KR | 20150011736 | * | 2/2002 |
| KR | 10-0829737 | B1 | 5/2008 |
| KR | 10-1211212 | B1 | 12/2012 |
| KR | 10-2015-0011736 | A | 2/2015 |
| KR | 10-1534515 | B1 | 7/2015 |
| KR | 10-2016-0061123 | A | 5/2016 |
| KR | 10-1728102 | B1 | 4/2017 |
| KR | 10-2018-0137705 | A | 12/2018 |
| KR | 10-2019-0072289 | A | 6/2019 |
| KR | 10-2020-0053783 | A | 5/2020 |
| KR | 10-2159041 | B1 | 9/2020 |

OTHER PUBLICATIONS

Communication pursuant to Article 94(3) EPC for European Application No. 21894931.1, dated May 28, 2025.
Extended European Search Report for European Application No. 21894931.1, dated Jul. 7, 2023.

* cited by examiner

【FIG. 1】                    CONVENTIONAL ART
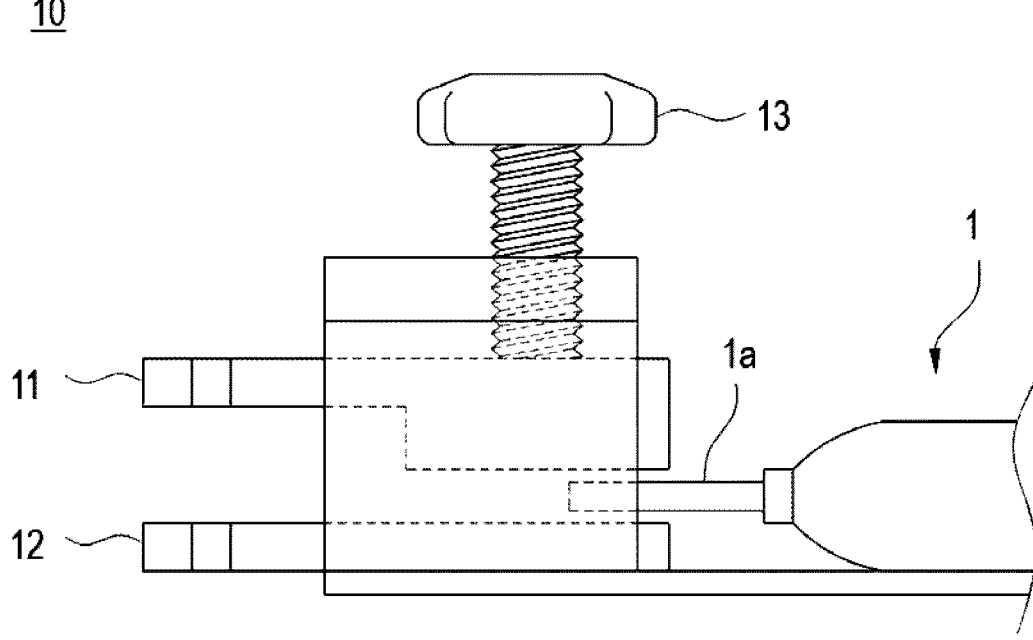

【FIG. 2】            CONVENTIONAL ART
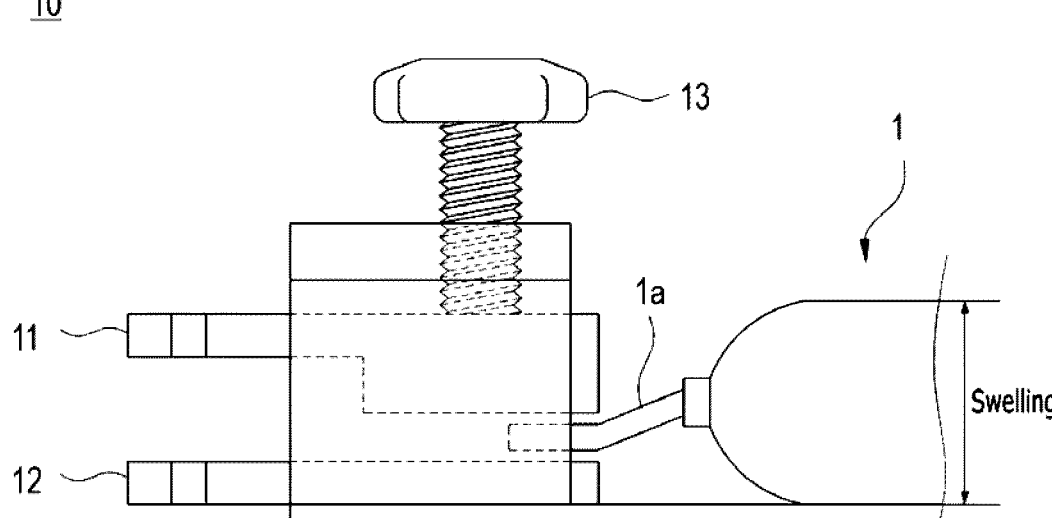

【FIG. 3】
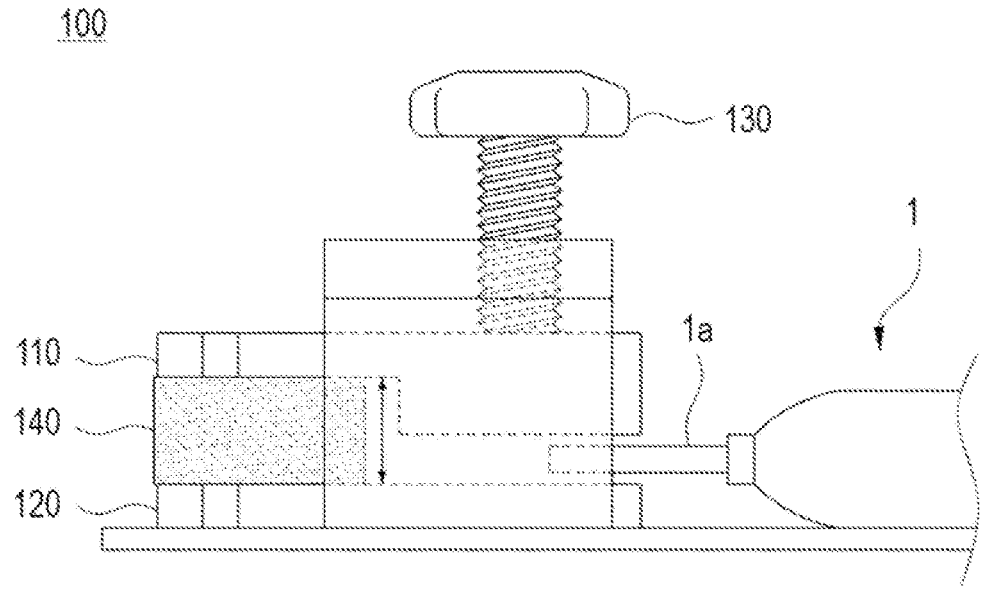

【FIG. 4】
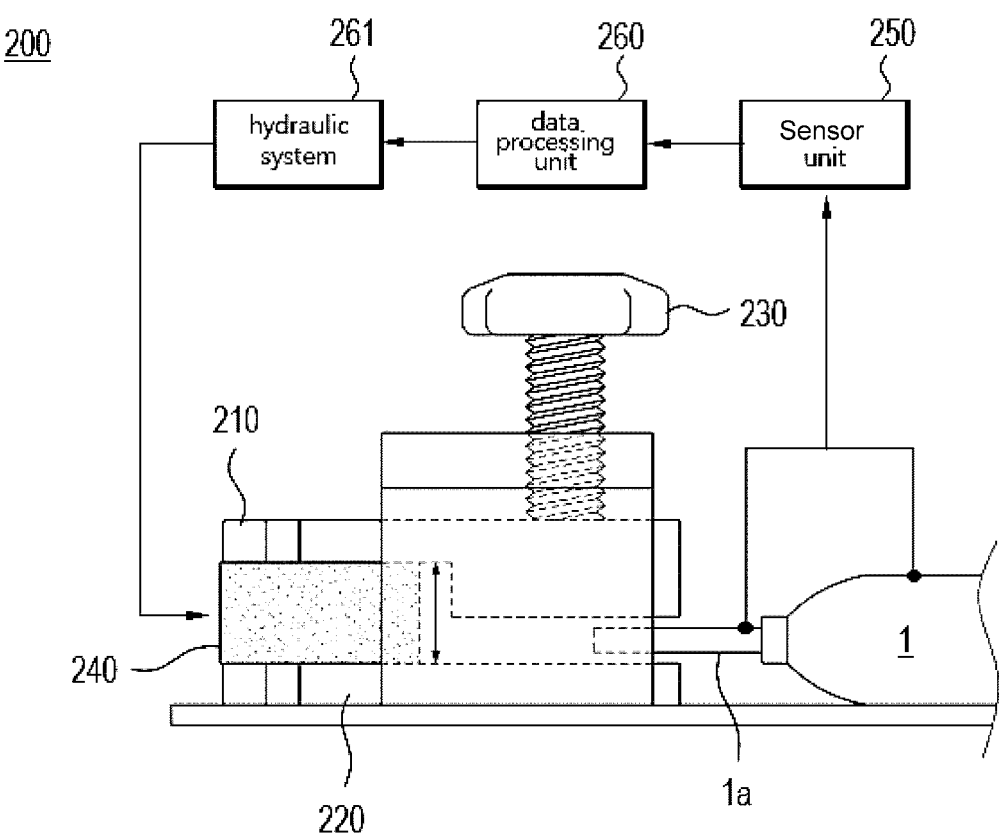

【FIG. 5】
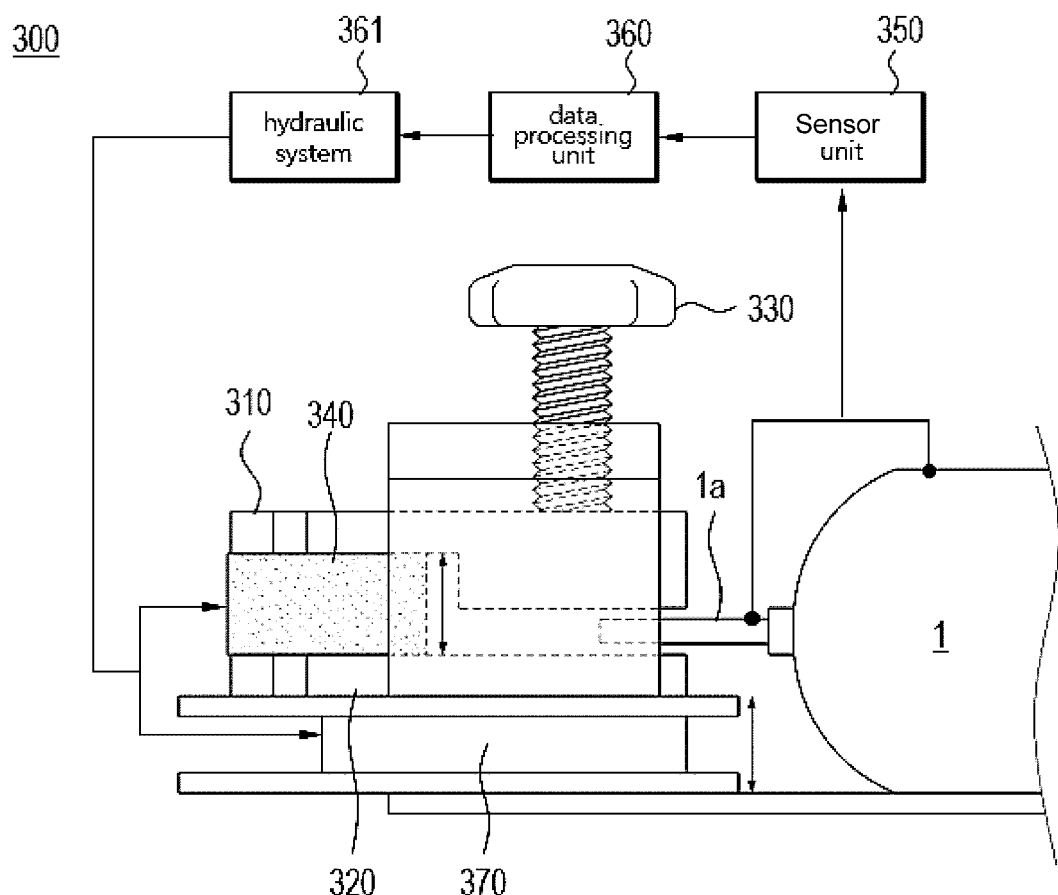

【FIG. 6】
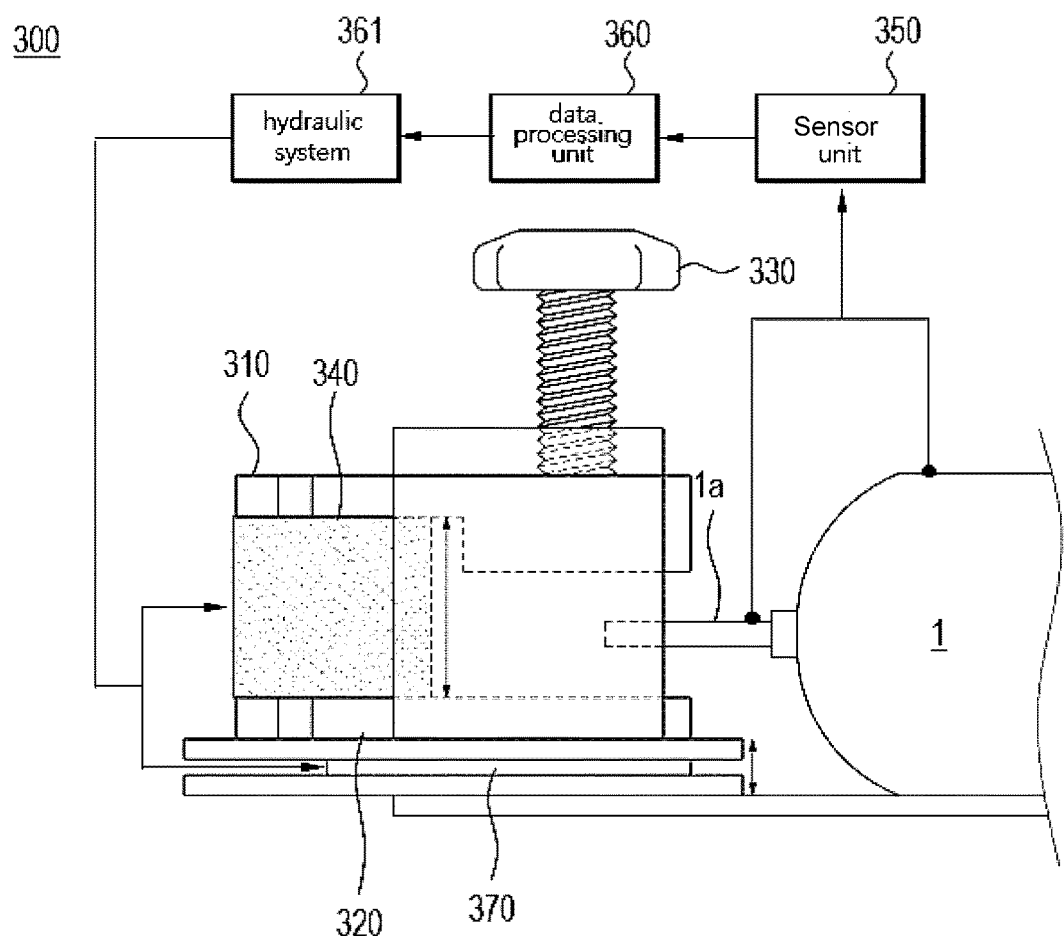

DEVICE FOR CHARGING AND DISCHARGING BATTERY CELL AND METHOD FOR CHARGING AND DISCHARGING BATTERY CELL USING THE SAME

TECHNICAL FIELD

This application claims the benefit of priority based on Korean Patent Application No. 10-2020-0157356, filed on Nov. 23, 2020, and the entire contents of the Korean patent application are incorporated herein by reference.

The present invention relates to a device for charging and discharging a battery cell, and a method of charging and discharging a battery cell using the same.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

In general, such a secondary battery is formed in a structure such that an electrode assembly including a positive electrode, a negative electrode, and a separator disposed therebetween is built in a battery case, and positive and negative electrode tabs are welded to two electrode tabs and are sealed to be exposed to the outside of the battery case. The electrode tab is electrically connected to the external device through contact with the external device, and the secondary battery supplies power to the external device through the electrode tab or receives power from the external device.

Meanwhile, the secondary battery is manufactured by accommodating an electrode assembly in a battery case and injecting electrolyte, followed by a battery activation step. At this time, the battery activation step includes the process of charging and discharging the secondary battery in the conditions necessary for activation after mounting the secondary battery in a device for charging and discharging a secondary battery. Such a secondary battery charging and discharging device is mainly used to charge or discharge the secondary battery in the battery activation step, as well as used for performance evaluation purposes of the secondary battery.

However, in order to properly charge or discharge the secondary battery using the secondary battery charging and discharging device, the secondary battery should be properly mounted on the charging and discharging device. That is, the electrode lead of the secondary battery is disposed to contact the conductive portion of the secondary battery charging and discharging device so that both are electrically connected, and the electrical connection state should be maintained while charging and discharging is in progress.

The secondary battery charging and discharging device for this purpose is generally provided with a fixing jig for fixing the electrode lead. When charging and discharging a secondary battery, if a conventional fixing jig as shown in FIG. 1 is applied, an electrode lead 1a is positioned between first and second jigs 11 and 12. Further, the height of the first jig 11 is lowered and the electrode lead 1a is pressed and fixed through a first jig block control unit 13. However, thickness of the battery cell 1 is changed according to a swelling phenomenon during the charge and discharge process as shown in FIG. 2. Specifically, a cell swelling phenomenon occurs in the battery cell 1 by the internal gas of the battery cell 1 or lithium by-products during the charge and discharge process. At this time, the electrode lead 1a of the battery cell 1 is in a fixed state, and disconnection occurs by the bending of the electrode lead 1a due to the cell swelling phenomenon. The disconnection of the electrode lead 1a may decrease the capacity of the battery cell 1 and ignite the battery cell 1.

Hence, there is a need for a method for preventing disconnection of the electrode lead or safety accidents, etc. during the charge and discharge process of the battery cell.

DISCLOSURE

Technical Problem

The present invention is believed to solve at least some of the above problems. For example, an aspect of the present invention provides a device for charging and discharging a battery cell, which can prevent the disconnection of a battery cell or safety accidents, etc., and a method of charging and discharging a battery cell using the device.

Technical Solution

The present invention provides a device for charging and discharging a battery cell. In one example, a device for charging and discharging a battery cell according to the present invention includes a pair of jigs configured to fix respective electrode leads of the battery cell. Herein, each jig includes: a first jig block configured to press a first surface of a corresponding electrode lead of the battery cell; a second jig block configured to press a second surface of the corresponding electrode lead facing the first surface of the corresponding electrode lead; a first jig block control unit connected to the first jig block to move the first jig block toward the first surface of the corresponding electrode lead; and an interval adjusting member arranged between the first and second jig blocks to control an interval between the first and second jig blocks.

In a specific example, the device for charging and discharging a battery cell according to the present invention includes: a sensor unit configured to measure at least one of a temperature, an electric current or a voltage of the battery cell; and a data processing unit configured to receive information on at least one of the temperature, the electric current or the voltage of the battery cell, measured by the sensor unit, and configured to determine whether to operate the interval adjusting member.

For example, the data processing unit may be configured to operate the interval adjusting member if at least one of the temperature, the electric current or the voltage of the battery cell, measured in the sensor unit, goes beyond a reference value range.

In one example, the interval adjusting member is connected to a hydraulic system to increase the interval between the first and second jig blocks by a fluid pressure transmitted from the hydraulic system.

In another example, the device for charging and discharging a battery cell according to the present invention further includes a height adjusting member arranged at a bottom of the second jig block, the height adjusting member controls a level of the second jig block or the jig. In a specific example, the interval adjusting member and the height adjusting member are connected to the hydraulic system. At this time, the interval adjusting member increases the interval between the first and second jig blocks by the fluid pressure transmitted from the hydraulic system, and the height adjusting member controls the level of the second jig block or the jig by the fluid pressure transmitted from the hydraulic system.

Further, the device for charging and discharging a battery cell according to the present invention may further include a charge and discharge unit electrically connected to the electrode leads of the battery cell, and the pair of jigs may be arranged in the same direction or may be arranged to face each other.

Further, the present invention provides a method for charging and discharging a battery cell using the above-described device for charging and discharging a battery cell. In one example, the method of charging and discharging a battery cell according to the present invention includes charging and discharging a battery cell in a state that the corresponding electrode lead has been fixed between the first and second jig blocks. At this time, at least one of a temperature, an electric current or a voltage of the battery cell is measured during the charging and discharging of the battery cell.

In a specific example, the method further includes increasing the interval between the first and second jig blocks if at least one of the temperature, the electric current or the voltage of the battery cell goes beyond a reference value range during the charging and discharging of the battery cell. Further, the measuring of at least one of the temperature, the electric current or the voltage of the battery cell is continually performed or is repeatedly performed at regular intervals during the charging and discharging of the battery cell.

Advantageous Effects

According to a device for charging and discharging a battery cell and a method of charging and discharging a battery cell using the same of the present invention, it is possible to prevent disconnection of an electrode lead and other safety accidents during the charge and discharge process of the battery cell by including an interval adjusting member which controls the interval between first and second jig blocks.

BRIEF DESCRIPTION OF THE DRAWINGS

FIGS. 1 to 2 are schematic diagrams illustrating a cell jig of a conventional battery cell charge/discharge device.

FIG. 3 is a schematic diagram showing a charge/discharge device of a battery cell according to one embodiment of the present invention.

FIG. 4 is a schematic diagram showing a charge/discharge device of a battery cell according to another embodiment of the present invention.

FIGS. 5 and 6 are schematic diagrams showing a charge/discharge device of a battery cell according to another embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention provides a device for charging and discharging a battery cell, and a method of charging and discharging a battery cell using the same.

A general device for charging and discharging a battery cell charges and discharges the battery cell in a state that the battery cell is fixed in a jig and evaluates the physical property of the battery cell as necessary. However, the thickness of the battery cell is changed according to the swelling phenomenon during the charge/discharge process. The electrode lead fixed at the jig is bent by the change in the thickness of the battery cell, and in some serious cases, the electrode lead may be disconnected. Such a disconnection of the electrode lead may decrease the capacity of the battery cell and ignite the battery cell. As such, the present invention is characterized in increasing the interval between the first and second jig blocks which fix the electrode lead, at the time of occurrence of an abnormal symptom in a battery cell, by forming an interval adjusting member at a space between the first and second jig blocks. The control of the such an interval adjusting member can be performed in a manual scheme by a person or an automatic scheme by a data processing unit.

Hereinafter, a device for charging and discharging a battery cell, and a method of charging and discharging a battery cell using the same according to the present invention will be described in detail.

In one example, a device for charging and discharging a battery cell according to the present invention includes a pair of jigs which fix one of two electrode leads of the battery cell, respectively. Herein, each of the jigs includes: a first jig block which presses one surface of an electrode lead of the battery cell; a second jig block which presses an other surface facing the one surface of the electrode lead; a first jig block control unit which is connected to the first jig block moves the first jig block toward the one surface of the electrode lead; and an interval adjusting member which is arranged between the first and second jig blocks and controls an interval between the first and second jig blocks.

The electrode lead is fixed in a state that the electrode lead is positioned between the first and second jig blocks. The scheme of fixing the electrode lead can be variously changed. For example, in a state that the second jig block at the lower side is fixed, the electrode lead may be pressed as the first jig block at the upper side is moved downwards. In some cases, the second jig block may be moved, or both first and second jig blocks may be moved to press the electrode lead.

The battery cell charge and discharge jig according to the present invention has a housing structure as necessary, and the first and second jig blocks are positioned in the housing structure. The movement of the first jig block may be performed by the first jig block control unit. The first jig block control unit may contact the first jig block through a hole formed at the upper member of the housing structure and may press the first jig block through helical rotation.

In one example, the jig includes an interval adjusting member. Specifically, the interval adjusting member is positioned between the first and second jig blocks and is used to stop the charge/discharge process by increasing the interval between the first and second jig blocks during the charge and discharge process of the battery cell.

Further, in another example, the device for charging and discharging a battery cell according to the present invention includes a sensor unit and a data processing unit. The sensor unit measures at least one of the temperature, the electric current and the voltage of the battery cell and may include at least one of a temperature sensor, a current sensor, and a voltage sensor. The temperature sensor may be connected to the terrace region of the battery cell, and the current sensor and the voltage sensor may be connected to the electrode lead. Further, the data processing unit receives information on at least one of the temperature, the electric current and the voltage of the battery cell, measured in the sensor unit and decides whether to operate the interval adjusting member. For example, the data processing unit pre-inputs data about the reference values of the temperature, current, and voltage of the battery cell. Further, the data processing unit may decide to operate the interval adjusting member if at least one of the temperature, the electric current and the voltage of the battery cell, measured in the sensor unit, goes beyond a reference value range. Herein, the reference value refers to a normal range of the temperature, current, and voltage of the battery cell.

In a specific example, if an abnormal state of the battery cell is sensed during the charge and discharge process of the battery cell, the sensor unit transmits the abnormal signal to the data processing unit, and the data processing unit decides to operate the interval adjusting member to increase the interval between the first and second jig blocks. As such, the interval adjusting member is used to stop the charge and discharge process by increasing the interval between first and second jig blocks during the performance evaluation of the battery cell.

Namely, when an abnormal signal is sensed in at least one of the temperature, the electric current and the voltage of the battery cell during the charge and discharge process of the battery cell, the device for charging and discharging a battery cell according to the present invention can prevent disconnection or other safety accidents of the electrode lead by stopping the charge and discharge process.

In one example, the interval adjusting member may have a tube shape into which air flows in and may be connected to a hydraulic system. Namely, the interval adjusting member may have a tube structure which is connected to a hydraulic system and is volume-changed by the fluid pressure transmitted from the hydraulic system. In a specific example, the interval between the first and second jig blocks is controlled by the fluid pressure transmitted from the hydraulic system. For example, the hydraulic system may be an air compressor. if the air pressure applied to the interval adjusting member by the air compressor is raised, the interval between the first and second jig blocks increases. As such, the interval adjusting member is used to stop the charge and discharge process by increasing the interval between first and second jig blocks during the performance evaluation of the battery cell.

In another example, the jig further includes a height adjusting member which is arranged at a bottom of the second jig block and controls a level of the second jig block or the jig. In a specific example, if the thickness of the battery cell increases during the charge and discharge process, the electrode lead of the battery cell is bent. In the present invention, the level of the electrode lead fixed at a position between the first and second jig blocks is raised by raising the height the second jig block or the jig through the height adjusting member. The bending of the electrode lead can be prevented even at the increase in the thickness of the battery cell by raising the level of the electrode lead.

The battery cell charge/discharge device according to the present invention further includes a thickness measuring sensor for measuring the thickness of a battery cell. The thickness measuring sensor is used to sense the change in the thickness of the battery cell, which is generated during the charge and discharge. Specifically, the thickness measuring sensor includes at least one of an optical sensor and a horizontal sensing rod. For example, an infrared sensor may be used as the optical sensor. For example, the thickness of the battery cell is sensed by forming a hinge-fastened rod at one side of the device and evaluating whether the rod has been bent and the bent degree. Further, the data processing unit may receive information on the thickness of the battery cell measured in the thickness measuring sensor and calculate the height of the electrode lead. Further, the height of the the height adjusting member can be controlled according to the height of the electrode lead, which is calculated in the data processing unit. Namely, the thickness of the battery cell is measured by the thickness measuring sensor, and the numerical value of the measured thickness is transmitted to the data processing unit. Further, the height level of the electrode lead can be derived from the transmitted numerical value of the thickness of the battery cell. For example, in the case that the electrode lead is positioned in the center of the battery cell, the point corresponding to ½ of the thickness of the battery cell becomes the level where the electrode lead should be positioned. The height adjusting member may be controlled to correspond to the derived height level of the electrode lead. Such a process can be performed through an automation process, even if there is no separate manual operation by a person. The thickness of the battery cell tends to continuously or gradually increase during the charge and discharge process. It is possible to control the height adjusting member according to the change in the thickness of the battery cell.

In another example, the interval adjusting member and the height adjusting member are connected to the hydraulic system, respectively. Further, the interval adjusting member increases the interval between the first and second jig blocks by the fluid pressure transmitted from the hydraulic system, and the height adjusting member controls the level of the second jig block or the jig by the fluid pressure transmitted from the hydraulic system. In a specific example, the thickness of the battery cell increases by the swelling phenomenon during the charge and discharge process, and the level of the second jig block or the jig increases through the height adjusting member as the thickness of the battery cell increases. At this time, if an abnormal state of the battery cell is sensed during the charge and discharge process of the battery cell, the sensor unit transmits the abnormal signal to the data processing unit, and the data processing unit decides to operate the hydraulic system connected to the interval adjusting member and the height adjusting member.

For example, if the sensor unit senses an abnormal state of the battery cell during the charge and discharge process of the battery cell, the hydraulic system transmits an air pressure to the interval adjusting member and discharges air having been supplied to the height adjusting member. At this time, the air pressure is transmitted to the interval adjusting member, and the air in the height adjusting member is discharged, thereby lowering the level of the second jig block. As such, the interval between the first and second jig blocks can increase. As such, the interval adjusting member is used to stop the charge and discharge process by increasing the interval between first and second jig blocks during the performance evaluation of the battery cell.

In one example, the device for charging and discharging a battery cell according to the present invention further includes a charge and discharge unit which is electrically connected to the electrode lead of the battery cell. The charge and discharge unit may be directly connected to the electrode lead of the battery cell. The charge and discharge unit may supply power for charge to battery cells accommodated in the charge and discharge device or receive discharge power from the battery cells. Herein, supplying power to the battery cells is not limited to supplying power which is sufficient for fully charging the battery cells. Supplying power to the battery cell may also mean supplying power which may be sufficient for measuring voltages of both electrode leads to evaluate performance of the secondary battery. The same may be applied to the meaning of receiving discharge power from the battery cells, and thus repeated description thereof is omitted here.

Further, the charge and discharge unit may be connected to each jig constituting a pair jigs of the device for charging and discharging a battery cell according to the present invention. For example, the charge and discharge unit may be electrically connected to at least one of first and second jig blocks of each jig, and in this case, the jig block connected to the charge and discharge unit may be a conductive metal block.

In one example, the battery cell charge and discharge device according to the present invention includes a pair of jigs, and the jigs may be arranged in the same direction or may be arranged to face each other. The arrangement of the jig may be changed according to the type of the battery cell. For example, in the case that the target battery cell has a positive electrode lead and a negative electrode lead at both ends, respectively, the jigs are arranged to face each other.

In one example, the battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

Further, the present invention provides a method for charging and discharging a battery cell using the above-described device for charging and discharging a battery cell. In one example, the method of charging and discharging a battery cell according to the present invention includes charging and discharging a battery cell in a state that an electrode lead has been fixed between first and second jig blocks. At this time, at least one of a temperature, an electric current and a voltage of the battery cell is measured during the charging and discharging of the battery cell.

In the present invention, the operation of charging and discharging the battery cell and the process of measuring at least one of the temperature, the electric current and the voltage of the battery cell are simultaneously performed. Specifically, at least one of a temperature, an electric current and a voltage of the battery cell is measured during the charging and discharging of the battery cell. However, in the present invention, it is possible that the operation of charging and discharging the battery cell and the process of measuring at least one of the temperature, the electric current and the voltage of the battery cell are alternately repeated. The charge and discharge device has been described above, and the redundant explanation will be omitted here.

In one example, the method of charging and discharging a battery cell according to the present invention includes a process of increasing the interval between the first and second jig blocks when at least one of the temperature, the electric current and the voltage of the battery cell goes beyond a reference value range during the charge and discharge process of the battery cell. In a specific example, the process of increasing the interval between the first and second jig blocks is performed by the interval adjusting member. For example, if at least one of the temperature, the electric current and the voltage of the battery cell goes beyond a reference value range during the charging and discharging of the battery cell, the interval adjusting member, which is positioned between the first and second jig blocks of the jig decides to operate itself and increases the interval between the first and second jig blocks, to thereby stop the charge and discharge process. Further, the interval adjusting member is connected to a hydraulic system, and the interval adjusting member may be controlled by the air pressure transmitted from the hydraulic system.

In another example, in the process of increasing the interval between the first and second jig blocks, the interval adjusting member and the height adjusting member, which are connected to a hydraulic system, respectively, may be interlocked. The detailed description about this has been described above, and the redundant explanation will be omitted here.

In one example, the measuring of at least one of the temperature, the electric current and the voltage of the battery cell is continually performed or is repeatedly performed at regular intervals during the charging and discharging of the battery cell. The change in the thickness of the battery cell may be caused by the swelling phenomenon during the charge and discharge process, and disconnection or an abnormal symptom may occur in the electrode lead. As such, according to the present invention, it is possible to prevent disconnection of an electrode lead or other safety accidents by sensing an abnormal signal in at least one of the temperature, the electric current and the voltage of a battery cell during the charge and discharge process of the battery cell and stopping the charge and discharge process.

DETAILED DESCRIPTION OF THE PREFERRED EMBODIMENTS

Hereinafter, various types of a device for charging and discharging a battery cell and a method of charging and discharging a battery cell using the same according to the present invention will be described with reference to the drawings.

First Embodiment

FIG. 3 is a schematic diagram showing a charge/discharge device of a battery cell according to one embodiment of the present invention. Referring to FIG. 3, the device for charging and discharging a battery cell according to the present invention includes a pair of jigs 100 which fix two electrode leads 1a of a battery cell 1. FIG. 3 illustrates one (first jig) of the jigs, and the other (second jig) of the jigs may be arranged in the same direction as the first jig or may be arranged to face the first jig.

The jig 100 includes: a first jig block 110 which presses one surface of an electrode lead 1a of the battery cell 1; a second jig block 120 which presses an other surface facing the one surface of the electrode lead 1a; a first jig block control unit 130 which is connected to the first jig block 110 moves the first jig block 110 toward the one surface of the electrode lead 1a; and an interval adjusting member 140 which is arranged between the first and second jig blocks 110 and 120 and controls an interval between the first and second jig blocks 110 and 120.

The jig 100 for charging and discharging the battery cell has a housing structure, and the first and second jig blocks 110 and 120 are positioned in the housing structure. The movement of the first jig block 110 may be performed by the first jig block control unit 130. The first jig block control unit 130 may contact the first jig block 110 through a hole formed at the housing structure and may press the first jig block 110 through helical rotation.

Further, an interval adjusting member 140 is positioned between the first and second jig blocks 110 and 120. Though not illustrated in FIG. 3, the interval adjusting member 140 is connected to a hydraulic system (not shown). The interval adjusting member 140 is controlled by the fluid pressure transmitted from the hydraulic system. The interval adjusting member 140 is used to stop the charge and discharge process by increasing the interval between first and second jig blocks 110 and 120 during the performance evaluation of the battery cell 1.

Second Embodiment

FIG. 4 is a schematic diagram showing a charge/discharge device of a battery cell according to another embodiment of the present invention. Referring to FIG. 4, the device for charging and discharging a battery cell according to the present invention includes a pair of jigs 200 which fix two electrode leads 1a of a battery cell 1. FIG. 4 illustrates one (first jig) of the jigs, and the other (second jig) of the jigs may be arranged in the same direction as the first jig or may be arranged to face the first jig.

The jig 200 includes: a first jig block 210 which presses one surface of an electrode lead 1a of the battery cell 1; a second jig block 220 which presses an other surface facing the one surface of the electrode lead 1a; a first jig block control unit 230 which is connected to the first jig block 210 moves the first jig block 210 toward the one surface of the electrode lead 1a; and an interval adjusting member 240 which is arranged between the first and second jig blocks 210 and 220 and controls an interval between the first and second jig blocks 210 and 220.

Further, the device for charging and discharging a battery cell according to the present invention further includes a sensor unit 250 and a data processing unit 260. Specifically, the sensor unit 250 measures at least one of a temperature, an electric current and a voltage of the battery cell 1, and the data processing unit 260 receives information on at least one of the temperature, the electric current and the voltage of the battery cell 1, measured by the sensor unit 250, and determines whether to operate the interval adjusting member 240. The data processing unit 260 pre-inputs data about the reference values of the temperature, current, and voltage of the battery cell 1. Further, the data processing unit 260 may decide to operate the interval adjusting member 240 if at least one of the temperature, the electric current and the voltage of the battery cell 1, measured in the sensor unit 250, goes beyond a reference value range.

Namely, if an abnormal state of the battery cell is sensed during the charge and discharge process of the battery cell 1, the sensor unit 250 transmits the abnormal signal to the data processing unit 260, and the data processing unit 260 decides to operate the interval adjusting member 240 to increase the interval between the first and second jig blocks 210 and 220. As such, the interval adjusting member 240 is used to stop the charge and discharge process by increasing the interval between first and second jig blocks 210 and 220 during the performance evaluation of the battery cell. Further, the interval adjusting member 240 is connected to a hydraulic system 261. The interval adjusting member 240 is controlled by the fluid pressure transmitted from the hydraulic system 261.

Third Embodiment

FIGS. 5 and 6 are schematic diagrams showing a charge/discharge device of a battery cell according to another embodiment of the present invention. Referring to FIGS. 5 and 6, the device for charging and discharging a battery cell according to the present invention includes a pair of jigs 300 which fix two electrode leads 1a of a battery cell 1. FIGS. 5 and 6 illustrate one (first jig) of the jigs, and the other (second jig) of the jigs may be arranged in the same direction as the first jig or may be arranged to face the first jig.

The jig 300 includes: a first jig block 310 which presses one surface of an electrode lead 1a of the battery cell 1; a second jig block 320 which presses an other surface facing the one surface of the electrode lead 1a; a first jig block control unit 330 which is connected to the first jig block 310 moves the first jig block 310 toward the one surface of the electrode lead 1a; and an interval adjusting member 340 which is arranged between the first and second jig blocks 310 and 320 and controls an interval between the first and second jig blocks 310 and 320.

Further, the jig 300 further includes a height adjusting member 370 which is arranged at a bottom of the second jig block 320 and controls a level of the second jig block 320 or the jig 300. Specifically, if the thickness of the battery cell 1 increases during the charge and discharge process, the electrode lead 1a of the battery cell 1 is bent. As such, in the present invention, the level of the electrode lead 1a fixed at a position between the first and second jig blocks 310 and 320 is raised by raising the height the second jig block 320 or the jig 300 through the height adjusting member 370. The bending of the electrode lead 1*a* can be prevented even at the increase in the thickness of the battery cell 1 by raising the level of the electrode lead 1*a*.

A thickness sensing member (not shown) for sensing the thickness of the battery cell 1 is positioned at the front end of the first jig block 310. The thickness sensing member senses th thickness of the battery cell 1 repeatedly or in real time during the charge and discharge process. If the thickness of the battery cell 1 increases, the thickness sensing member senses the increase, and the level of the second jig block 320 or the jig 300 is raised through the height adjusting member 370. By repeating such a process, the jig 300 of the present invention can designate an appropriate level of the electrode lead 1*a* according to the thickness of the battery cell 1. Further, the height adjusting member 370 is connected to a hydraulic system 361. The height adjusting member 370 is controlled by the fluid pressure transmitted from the hydraulic system 361.

Further, the device for charging and discharging a battery cell according to the present invention further includes a sensor unit 350 and a data processing unit 360. Specifically, the sensor unit 350 measures at least one of a temperature, an electric current and a voltage of the battery cell 1, and the data processing unit 360 receives information on at least one of the temperature, the electric current and the voltage of the battery cell 1, measured by the sensor unit 350, and determines whether to operate the interval adjusting member 340.

If an abnormal state of the battery cell 1 is sensed during the charge and discharge process of the battery cell 1, the sensor unit 350 transmits the abnormal signal to the data processing unit 360, and the data processing unit 360 decides to operate the interval adjusting member 340 to increase the interval between the first and second jig blocks 310 and 320. The interval adjusting member 340 is connected to a hydraulic system 361, and the interval adjusting member 340 is controlled by the air pressure transmitted from the hydraulic system 361. At this time, the operation of the interval adjusting member 340 is linked to the operation of the height adjusting member 370.

Specifically, the thickness of the battery cell 1 increases by the swelling phenomenon during the charge and discharge process, and the level of the second jig block 320 or the jig 300 increases through the height adjusting member 370 as the thickness of the battery cell 1 increases. Further, when sensing an abnormal state of a battery cell 1 during the charge and discharge process of the battery cell 1, the sensor unit 350 transmits the abnormal signal to the data processing unit 360, and the data processing unit 360 decides to operate the hydraulic system 361 connected to the interval adjusting member 340 and the height adjusting member 361. Specifically, when the sensor unit 350 senses an abnormal state of the battery cell 1 during the charge and discharge process of the battery cell 1, the hydraulic system 361 transmits an air pressure to the interval adjusting member and discharges air having been supplied to the height adjusting member 370. At this time, the air pressure is transmitted to the interval adjusting member 340, and the air in the height adjusting member 370 is discharged, thereby lowering the level of the second jig block 320. As such, the interval between the first and second jig blocks 310 and 320 can increase.

Hence, the interval adjusting member 340 is used to stop the charge and discharge process by increasing the interval between first and second jig blocks 310 and 320 during the performance evaluation of the battery cell 1.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS

1: battery cell
1*a*: electrode lead
10, 100, 200, 300: jig
11, 110, 210, 310: first jig block
12, 120, 220, 320: second jig block
13, 130, 230, 330: first jig block control unit
140, 240, 340: interval adjusting member
250, 350: sensor unit
260, 360: data processing unit
261, 361: hydraulic system
370: height adjusting member

The invention claimed is:

1. A device for charging and discharging a battery cell, the device comprising:
a pair of jigs configured to fix respective electrode leads of the battery cell, wherein each jig includes:
a first jig block configured to press a first surface of a corresponding electrode lead of the battery cell;
a second jig block configured to press a second surface of the corresponding electrode lead facing the first surface of the corresponding electrode lead;
a first jig block control unit connected to the first jig block to move the first jig block toward the first surface of the corresponding electrode lead; and
an interval adjusting member arranged between the first and second jig blocks to control an interval between the first and second jig blocks,
wherein the interval adjusting member is connected to a hydraulic system to increase the interval between the first and second jig blocks by a fluid pressure transmitted from the hydraulic system.

2. The device of claim 1, further comprising:
a sensor unit configured to measure at least one of a temperature, an electric current or a voltage of the battery cell; and
a data processing unit configured to receive information on the at least one of the temperature, the electric current or the voltage of the battery cell, measured by the sensor unit, and configured to determine whether to operate the interval adjusting member.

3. The device of claim 2, wherein the data processing unit is configured to operate the interval adjusting member if the at least one of the temperature, the electric current or the voltage of the battery cell, measured in the sensor unit, goes beyond a reference value range.

4. The device of claim 1, further comprising a charge and discharge unit electrically connected to the electrode leads of the battery cell.

5. The device of claim 1, wherein the pair of jigs are arranged in a same direction or are arranged to face each other.

6. A method for charging and discharging a battery cell using the device of claim 1.

7. The method of claim 6, further comprising charging and discharging a battery cell in a state that the corresponding electrode lead has been fixed between the first and second jig blocks, wherein at least one of a temperature, an electric current or a voltage of the battery cell is measured during the charging and discharging of the battery cell.

8. The method of claim 7, further comprising increasing the interval between the first and second jig blocks if the at least one of the temperature, the electric current or the voltage of the battery cell goes beyond a reference value range during the charging and discharging of the battery cell.

9. The method of claim 7, wherein the measuring of the at least one of the temperature, the electric current or the voltage of the battery cell is continually performed or is repeatedly performed at regular intervals during the charging and discharging of the battery cell.

10. A device for charging and discharging a battery cell, the device comprising:

a pair of jigs configured to fix respective electrode leads of the battery cell, wherein each jig includes:

a first jig block configured to press a first surface of a corresponding electrode lead of the battery cell;

a second jig block configured to press a second surface of the corresponding electrode lead facing the first surface of the corresponding electrode lead;

a first jig block control unit connected to the first jig block to move the first jig block toward the first surface of the corresponding electrode lead;

an interval adjusting member arranged between the first and second jig blocks to control an interval between the first and second jig blocks; and a height adjusting member arranged at a bottom of the second jig block, the height adjusting member controlling a level of the second jig block.

11. The device of claim 10, wherein the interval adjusting member and the height adjusting member are connected to a hydraulic system, wherein the interval adjusting member is configured to increase the interval between the first and second jig blocks by a fluid pressure transmitted from the hydraulic system, and wherein the height adjusting member is configured to control the level of the second jig block by the fluid pressure transmitted from the hydraulic system.

* * * * *